United States Patent [19]
Sekine et al.

[11] Patent Number: 6,137,825
[45] Date of Patent: Oct. 24, 2000

[54] COMMUNICATION SYSTEM, TRANSMITTER AND RECEIVER

[75] Inventors: Kiyoki Sekine; Manabu Kawabe, both of Tokyo, Japan

[73] Assignee: Oki Electric Industry Co., Ltd., Tokyo, Japan

[21] Appl. No.: 09/041,108

[22] Filed: Mar. 12, 1998

[30] Foreign Application Priority Data

Apr. 9, 1997 [JP] Japan ................................. 9-090537

[51] Int. Cl.[7] .................................................. H04K 1/00
[52] U.S. Cl. ........................ 375/130; 375/146; 375/147
[58] Field of Search .................................. 375/130, 146, 375/147, 283, 308, 279, 329, 330; 370/335, 342, 320

[56] References Cited

U.S. PATENT DOCUMENTS

| 5,926,500 | 7/1999 | Odenwalder ............................. 375/200 |
| 5,930,230 | 7/1999 | Odenwalder et al. ................... 375/208 |
| 5,943,329 | 8/1999 | Ohgoshi et al. ........................ 370/335 |

OTHER PUBLICATIONS

Telecommunications Industry Assoc., TIA/EIA/IS–95, Mobile Station–Base Station Compatibility Standard for Dual–Mode Wideband Spread Spectrum Cellular System, 1993 pp. 6–1–7–41.

Joint Technical Committee, "W–CDMA (Wideband Code Division Multiple Access) Air Interface Compatibility Standard for 1.85 to 1.99 Ghz PCS Application", 1995, pp. 3–1–4–41.

*Primary Examiner*—Tesfaldet Bocure
*Attorney, Agent, or Firm*—Venable; Robert J. Frank; Allen Wood

[57] ABSTRACT

Differences between two adjacent bits of connection control data are derived in sequence. The derived differences are logically combined with a pilot signal and simultaneously with user data. The logically combined signals are spread to spreading bands and added to each other. The added signal is used as a modulating signal and transmitted through phase shift keying (PSK). Thereafter, the PSK modulated carrier is demodulated to derive the modulating signal. The modulating signal is despread to derive a user signal. The user signal includes the user data and the foregoing differences. The modulating signal is further despread to derive the pilot signal with the foregoing differences included. The pilot signal with the foregoing differences is subjected to a conjugate conversion and then multiplied by the user signal so that the foregoing differences are removed from the user signal to obtain the user data. The connection control data is reconstructed from the foregoing differences included in the pilot signal.

15 Claims, 6 Drawing Sheets

COMMUNICATION SYSTEM, TRANSMITTER AND RECEIVER

BACKGROUND OF THE INVENTION

1. Field of the Invention

The present invention relates to a communication system, a transmitter and a receiver, and is applicable, for example, to a mobile radio communication system, such as, a personal communication system or a digital cellular system, and a mobile station and a base station employed therein, and is further applicable to a transmitter-receiver of a mobile radio switching system.

2. Description of the Prior Art

Many conventional mobile radio communication systems follow a standard (literature 1) entitled "Mobile Station-Base Station Compatibility Standard for Dual-Mode Wideband Spread Spectrum Cellular System, TIA/EIA/IS-95" published as an international standard of the Telecommunications Industry Association/Electronics Industry Association and a standard (literature 2) entitled "W-CDMA (Wideband Code Division Multiple Access) Air Interface Compatibility Standard for 1.85 to 1.99 GHz PCS Applications, IS-665" proposed at the Joint Technical Committee thereof.

The literature 1 describes a technique for time-division allocating connection control data into frames of voice data, which is user data, for multiplex transmission on a traffic channel either from a base station to a mobile station or from a mobile station to a base station.

FIG. 4 shows a down-link structure from a base station to a mobile station according to the literature 1, and FIG. 5 shows an up-link structure from a mobile station to a base station according to the literature 1.

In the down-link structure shown in FIG. 4, the base station BS and the mobile station MS are connected to each other via a radio propagation path 107. The base station BS comprises a pilot signal spreading circuit 101 to be inputted with a pilot signal "all 0's", a time-division multiplex (TDM) frame generator 102 for time-division multiplexing connection control data and user data, a user signal spreading circuit 103, an adder 104, a carrier modulator 105 and an antenna 106. On the other hand, the mobile station MS comprises an antenna 108, a carrier demodulator 109, a user signal despreading circuit 110, a pilot signal despread circuit 112, a multiplier 111, a conjugate conversion circuit 113 and a TDM frame demultiplexer 114.

In the up-link structure shown in FIG. 5, the mobile station MS and the base station BS are connected to each other via a radio propagation path 206. The mobile station MS comprises a TDM frame generator 201 to be inputted with connection control data and user data, a Walsh spreading circuit 202, a user signal spreading circuit 203, a carrier modulator 204 and an antenna 205. On the other hand, the base station comprises an antenna 207, a carrier demodulator 208, a user signal despreading circuit 209, a Walsh despreading circuit 210 and a TDM frame demultiplexer 211.

With the foregoing arrangement, the TDM frame generator 102 of the base station BS in the down link and the TDM frame generator 201 of the mobile station MS in the up link suitably multiplex user data, such as voice data, and connection control data in each of traffic channel frames having a data region of 168 bits. The data allocation is determined by the transmission rate of the user data and classified into five frame formats, that is, transmission of only the user data, transmission of ½ user data and ½ connection control data, transmission of ¼ user data and ¾ connection control data, transmission of ⅛ user data and ⅞ connection control data and transmission of only the connection control data. In case of the 9600 bps transmission rate, the ratios between the number of user data bits and the number of connection control data bits per frame are 171/0, 80/88, 40/128, 16/152 and 0/168 in the foregoing five frame formats, respectively. Due to difference in error correcting methods, the ratios of 80/88, 40/128 and 16/152 slightly deviate from the ratios of 1/2:1/2, 1/4:3/4 and 1/8:7/8, respectively. Using the foregoing frame formats, the ratio between the user data and the connection control data is adjusted according to the amount of the user data.

In the down link shown in FIG. 4, the multiplexed data from the TDM frame generator 102 is spread at the user signal spreading circuit 103 and then given to the adder 104. On the other hand, a common pilot channel including no data is spread at the pilot signal spreading circuit 101 and also given to the adder 104. At the adder 104, the spread signals from the circuits 101 and 103 are multiplexed. Then, at the carrier modulator 105, modulation, for example, phase shift keying (PSK), is carried out using the multiplexed spread signal from the adder 104 as a modulating signal to obtain a PSK modulated carrier. The PSK modulated carrier is transmitted to the mobile station MS from the antenna 106. The PSK modulated carrier is received at the antenna 108 of the mobile station MS via the radio propagation path 107 and then demodulated at the carrier demodulator 109 to obtain the modulating signal. The modulating signal is then fed to the user signal despreading circuit 110 and the pilot signal despreading circuit 112 so as to be despread respectively. The pilot signal, in the form of a complex number signal given from the pilot signal despreading circuit 112, is subjected to a conjugate conversion at the conjugate conversion circuit 113 and is then given to the multiplier 111. At the multiplier 111, an output signal from the user signal despreading circuit 110 is multiplied by the pilot signal from the conjugate conversion circuit 113 so that a random phase rotation of the output signal from the circuit 110 caused by fading in the radio propagation path is corrected. Then, the corrected output signal is demultiplexed into the connection control data and the user data at the TDM frame demultiplexer 114.

On the other hand, in the up link shown in FIG. 5, the multiplex data from the TDM frame generator 201 is Walsh spread by the M-ary spreading at the Walsh spreading circuit 202. Then, the multiplexed data is spread at the user signal spreading circuit 203 and given to the carrier modulator 204. At the carrier modulator 204, modulation, for example, phase shift keying (PSK), is carried out using the multiplexed spread signal from the circuit 203 as a modulating signal to obtain a PSK modulated carrier. The PSK modulated carrier is transmitted to the base station BS from the antenna 205. The PSK modulated carrier is received at the antenna 207 of the base station BS via the radio propagation path 206 and then demodulated at the carrier demodulator 208 to obtain the modulating signal. The modulating signal is then fed to the user signal despreading circuit 209, where it is despread Thereafter, the despread signal from the circuit 209 is given to the Walsh despread circuit 210, where it is Walsh despread The despreading signal from the circuit 210 is then demultiplexed into the connection control data and the user data at the TDM frame demultiplexer 211.

In the up link, as described above, the spreading and the despreading are carried out with Walsh functions so as to establish asynchronous communication where no pilot signal is used. In this asynchronous communication, an information bit sequence is spread into orthogonal code sequences at the transmitter side, and the sequence having the greatest correlation value is selected at the receiver side.

FIG. 6 shows an up-link structure from a mobile station to a base station according to the literature 2.

FIG. 6, the mobile station MS comprises a pilot signal spreading circuit 301, a connection control signal spreading circuit 302, a user signal spreading circuit 303, an adder 304, a carrier modulator 305 and an antenna 306.

In the mobile station MS, a pilot signal, connection control data and user data are spread at the spreading circuits 301, 302 and 303, respectively, and then superposed at the adder 304. The user data (voice data or the like) is spread into in-phase (I-phase) components and quadrature-phase (Q-phase) components using a quadrature pair of different spreading codes. Thereafter, at the carrier modulator 305, modulation, for example, phase shift keying (PSK), is carried out using an output signal from the adder 304 as a modulating signal to obtain a PSK modulated carrier. The PSK modulated carrier is transmitted to the base station BS from the antenna 306. The PSK modulated carrier is received at an antenna 308 of the base station BS via a radio propagation path 307 and then demodulated at a carrier demodulator 309 to obtain the modulating signal. The modulating signal is then fed to a user signal despreading circuit 310, a connection control signal despreading circuit 312 and a pilot signal despreading circuit 314 so as to be despread respectively. The pilot signal in the form of a complex number signal given from the pilot signal despreading circuit 314 is subjected to a conjugate conversion at a conjugate conversion circuit 315 and is then given to a multiplier 311 and a multiplier 313. At the multiplier 311, an output signal from the user signal despreading circuit 310 is multiplied by the pilot signal from the conjugate conversion circuit 315 so that the user data is obtained. Similarly, at the multiplier 313, an output signal from the connection control signal despreading circuit 312 is multiplied by the pilot signal from the conjugate conversion circuit 315 so that the connection control data is obtained. As in the foregoing down link according to the literature 1, the pilot signal is used for correcting a random phase rotation of the signals caused by fading in the radio propagation path.

In the mobile radio communication system according to the literature 1, since the user data and the connection control data are time-division multiplexed on the traffic channel, the transmission rate of the user data is lowered.

Further, time-division multiplexers are required for all the traffic channels, and controllers are required for determining allocation of the user data and the connection control data into the traffic channel frames. Accordingly, the hardware becomes complicated in structure and enlarged in size.

The framing operation for the user data and the connection control data further causes a transmission delay of the user data. Further, voice detection circuits are necessary, which further makes it difficult to design the whole communication system.

Further, in the asynchronous communication from the mobile station to the base station, since the pilot signal is not used, errors in symbols as a result of the spreading of the information are increased and, for correcting them, the redundant M-ary spreading is required. This lowers the transmission rate.

In the mobile radio communication system according to the literature 2, the foregoing problems are eliminated to a large extent. However, since the pilot channel and the connection control channel are multiplexed on the I-phase and Q-phase information channels, interference occurs among those channels and further occurs relative to other mobile stations communicating with same base station.

SUMMARY OF THE INVENTION

Therefore, it is an object of the present invention to provide an improved communication system, an improved transmitter and an improved receiver.

According to one aspect of the present invention, a transmitter comprises a circuit for receiving first data and deriving second data representing relative changes between adjacent states of the first data; a first spreading circuit for receiving the second data and spreading the second data to a spreading band by a first spreading code to derive first spread data; a logic circuit for receiving third data and logically combining the third data and the second data to derive fourth data; a second spreading circuit for receiving the fourth data and spreading the fourth data to a spreading band by a second spreading code to derive second spread data, the first and second spreading codes being different from each other; an adding circuit for adding the first and second spread data to derive third spread data; and a modulating circuit for receiving the third spread data and applying phase shift keying to the third spread data.

It may be arranged that the transmitter further comprises another logic circuit for logically combining the second data and a pilot signal at a baseband, the pilot signal adapted to correct random phase rotation caused by fading in a radio propagation path, that the first spreading circuit receives an output from the another logic circuit and spreads the output by the first spreading code to derive the first spread data, and that the first data is connection control data.

It may be arranged that the first data is connection control data including a data pattern of a pilot signal at a baseband, the pilot signal adapted to correct random phase rotation caused by fading in a radio propagation path.

According to another aspect of the present invention, a receiver comprises a demodulating circuit for receiving a carrier modulated through phase shift keying and demodulating the modulated carrier to derive data at spreading bands; a first despread circuit for despread the data by a first spreading code to extract a first data component; a second despread circuit for despread the data by a second spreading code different from the first spreading code to extract a second data component; a first decoding circuit for processing the first data component from the first despread circuit to derive first data, the first data component representing relative changes between adjacent states of the first data; and a second decoding circuit for multiplying the second data component from the second despread circuit by the first data component from the first despread circuit to correct random phase rotation due to fading in a radio propagation path so as to derive second data.

According to another aspect of the present invention, a communication system comprises a first communication device including the foregoing receiver and a second communication device including the foregoing transmitter.

According to another aspect of the present invention, a communication system according to a code division multiple access system comprises a first and a second communication device, each of the first and second communication devices including the foregoing transmitter and the foregoing receiver.

It may be arranged that the first communication device comprises a circuit for transmitting, after receipt of a signal from the second communication device, a message to the second communication device notifying completion of the receipt of the signal, and that the second communication device comprises a circuit for transmitting, after receipt of the message, the foregoing third data.

It may be arranged that the first communication device comprises a circuit for transmitting, after receipt of a signal from the second communication device, a message to the second communication device notifying completion of the receipt of the signal, and that the second communication device comprises a circuit for transmitting, after receipt of the message, the foregoing first data.

According to a preferred embodiment of the present invention, connection control data, which is conventionally allocated on a connection control channel, is superposed upon baseband data on a pilot channel (pilot signal) so as to combine the pilot channel and the connection control channel to be one. However, if the connection control data is simply superposed upon the pilot signal, the pilot signal can not work to correct the random phase rotation caused by fading in a radio propagation path. Thus, in the preferred embodiment of the present invention, the connection control data is also superposed upon baseband user data, such as voice data, on an information channel. The user data is transmitted through phase shift keying (PSK), while the connection control data is transmitted through differential phase shift keying (DPSK). Even if the pilot signal is inverted due to the superposed connection control data, the user data on the information channel is also inverted so that the user data can be demodulated. Further, since the connection control data is transmitted through the differential phase shift keying (DPSK), demodulation of the connection control data is ensured.

In the differential phase shift keying (DPSK), as compared with the phase shift keying (PSK), the error probability characteristic relative to the SN ratio is generally degraded. However, since the connection control data is the data at the low transmission rate as compared with the data on the information channel, the problem is solved by applying an error correction coding system having a smaller coding ratio (information block length before coding/information block length after coding) depending on necessity.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENTS

Now, preferred embodiments of the present invention will be described hereinbelow with reference to the accompanying drawings. In the preferred embodiments, a communication system, a transmitter and a receiver according to the present invention are applied to a personal communication system (mobile radio communication system) following a code division multiple access system, and a mobile station and a base station employed therein.

In the description preferred embodiments, reference will be made to an up link of the personal communication system. However, the present invention is applicable to both up and down links of the personal communication system and other communication systems.

Figure 4:
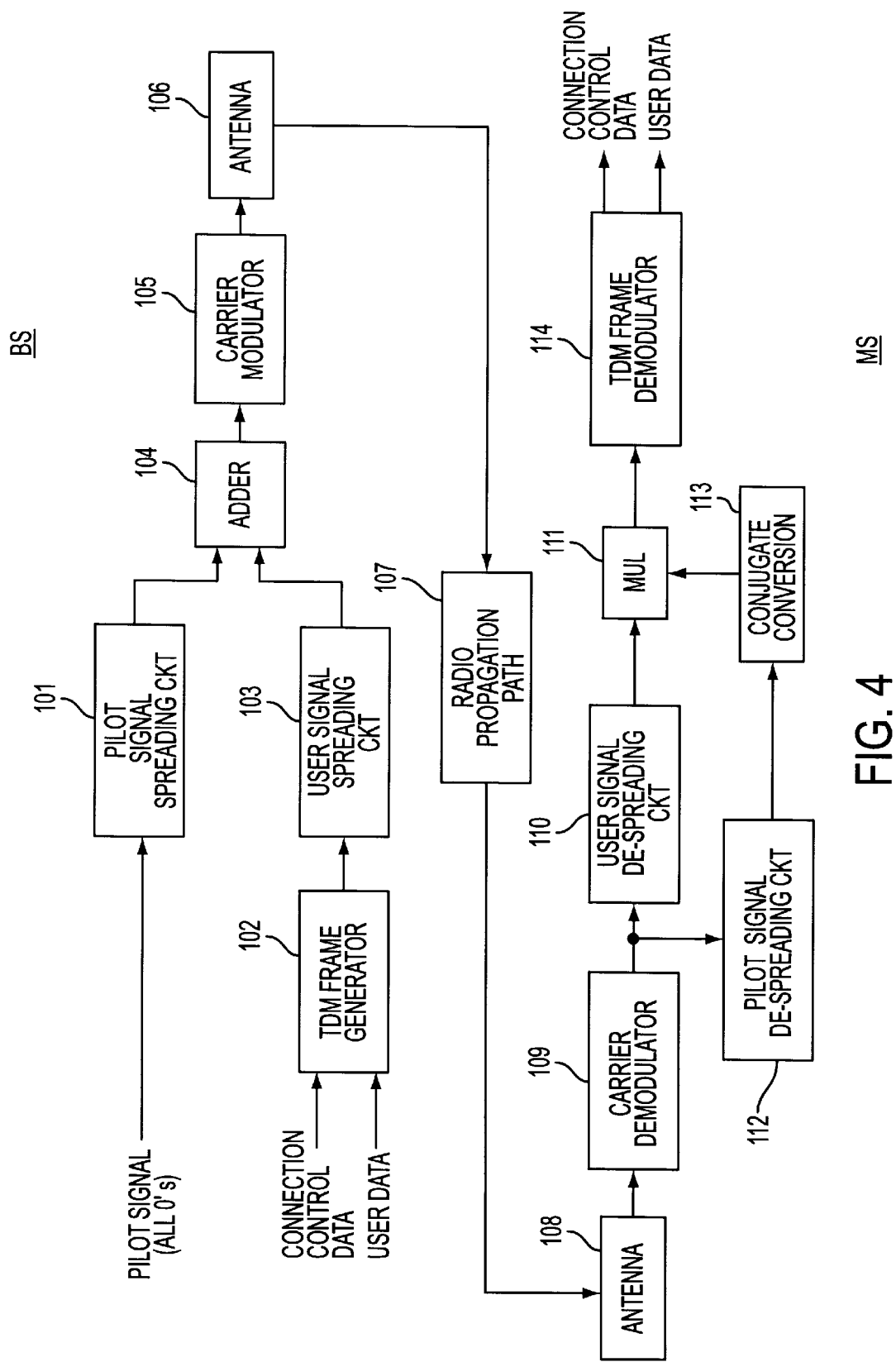
FIG. 4 is a block diagram showing a conventional down-link structure.
Figure 5:
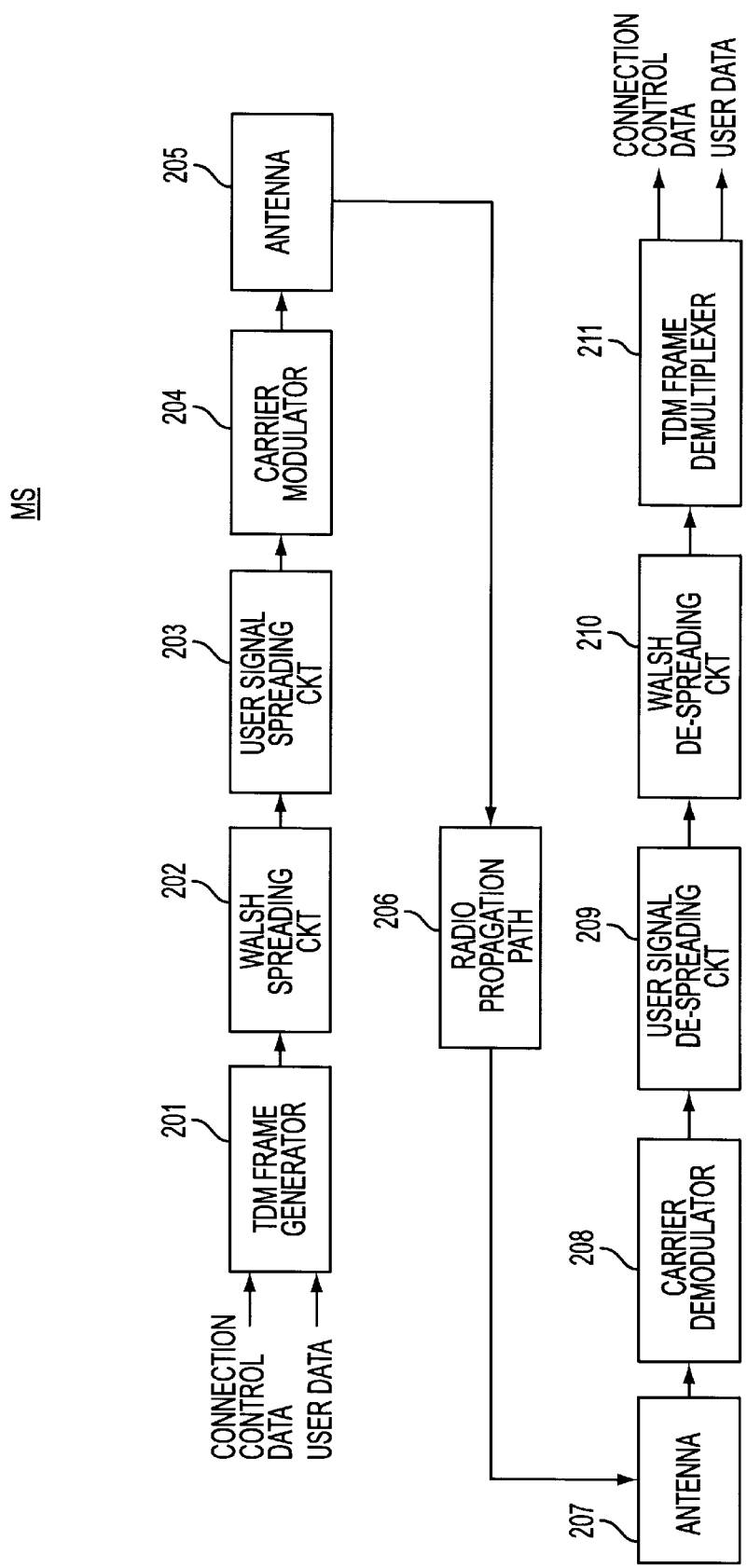
FIG. 5 is a block diagram showing a conventional up-link structure.
Figure 6:
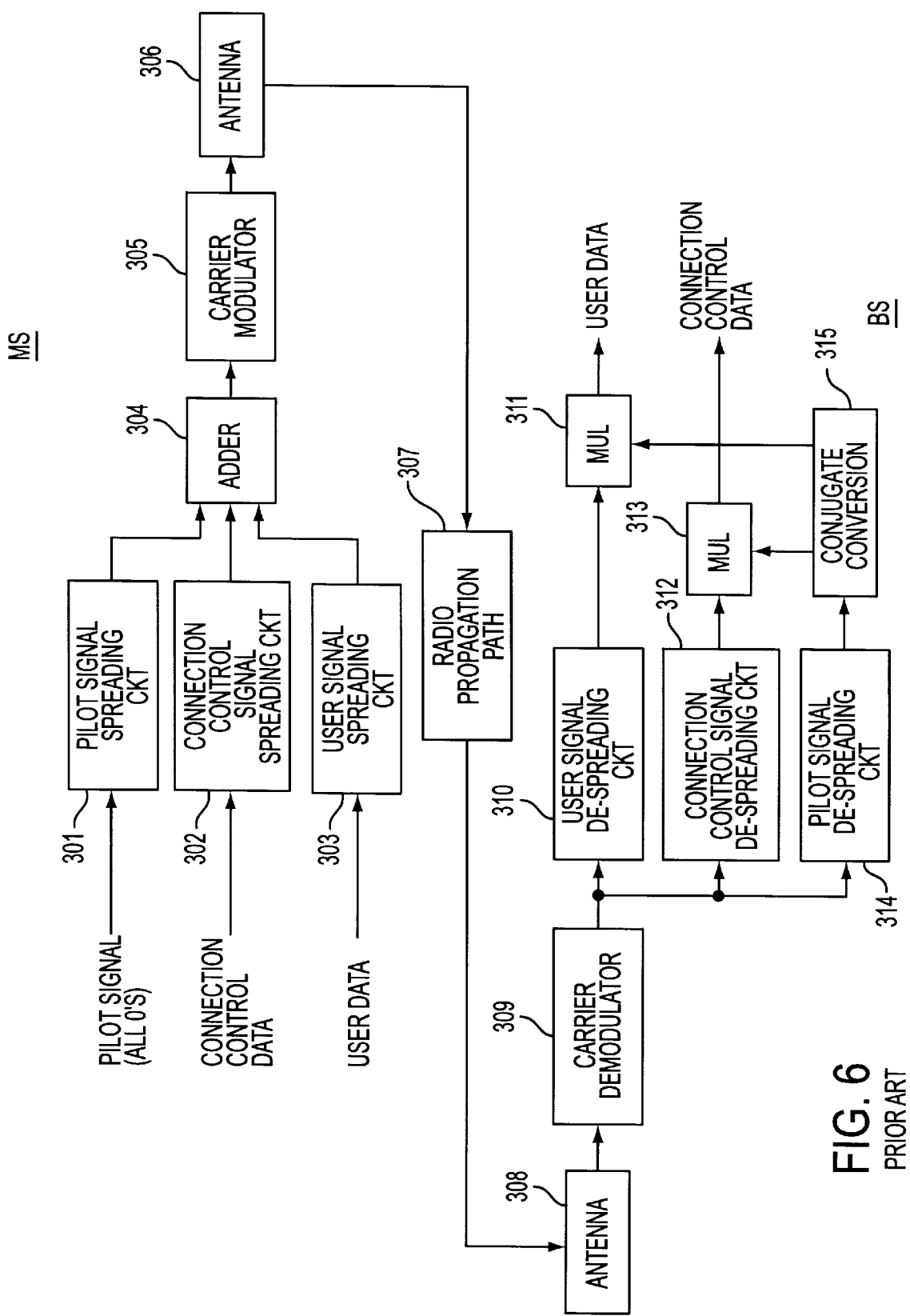
FIG. 6 is a block diagram showing another conventional up-link structure.

On the other hand, the down link may have a structure similar to the conventional structure as shown in FIG. 4.

Figure 1:
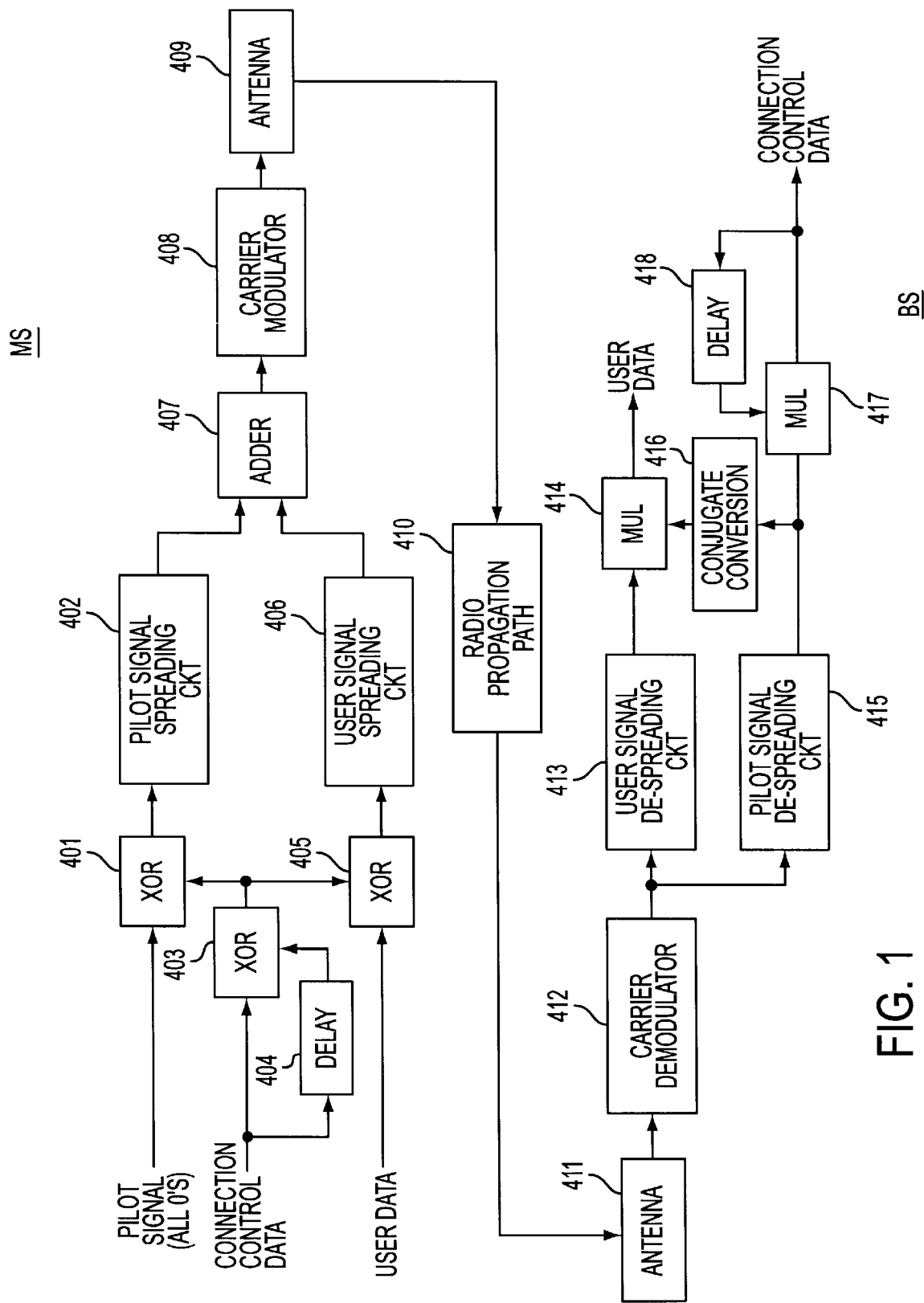
FIG. 1 is a block diagram showing a communication system according to a first preferred embodiment of the present invention.

FIG. 1 is a block diagram showing structures of a mobile station MS and a base station BS in the up link of the personal communication system according to the first preferred embodiment of the present invention.

In FIG. 1, the mobile station MS comprises three exclusive OR logic circuits (hereinafter referred to as "XOR's") 401, 403 and 405, a pilot signal spreading circuit 402, a one-bit delay circuit 404, a user signal spreading circuit 406, an adder 407, a carrier modulator 408 and an antenna 409.

On the other hand, the base station BS is connected to the mobile station MS via a radio propagation path 410 and comprises an antenna 411, a carrier demodulator, a user signal despreading circuit 413, a multiplier 414, a pilot signal despreading circuit 415, a conjugate conversion circuit 416, a multiplier 417 and a one-bit delay circuit 418.

In the mobile station MS, connection control data is given to the XOR 403 and the delay circuit 404. The connection control data delayed by one bit at the delay circuit 404 is also fed to the XOR 403. Thus, differences between the adjacent bits, that is, relative changes between adjacent states, of the inputted connection control data are derived in sequence at the XOR 403 and fed to the XOR's 401 and 405. This means that, after having been subjected to phase shift keying (PSK) at the carrier modulator 408, the connection control data is considered to have been processed by differential phase shift keying (DPSK).

A pilot signal (all 0's) is inputted to the XOR 401, where an exclusive OR operation is executed to derive an exclusive OR between the inputted pilot signal and the output from the XOR 403. The output of the XOR 401 is spread at the pilot signal spreading circuit 402 and given to the adder 407. On the other hand, user data is inputted to the XOR 405, where an exclusive OR between the inputted user data and the output from the XOR 403 is derived. The output of the XOR 405 is spread at the user signal spreading circuit 406 and given to the adder 407. The spread signals from the circuits 402 and 406 are multiplexed at the adder 407. Then, at the carrier modulator 408, the phase shift keying (PSK) is carried out using the multiplexed spread signal from the adder 407 as a modulating signal to obtain a PSK modulated carrier. The PSK carrier is transmitted to the base station BS from the antenna 409.

The PSK modulated carrier is received at the antenna 411 of the base station BS via the radio propagation path 410 and then demodulated at the carrier demodulator 412 to obtain the modulating signal. The modulating signal is then fed to the user signal despreading circuit 413 and the pilot signal despreading circuit 415 so as to be despread, respectively.

Specifically, the modulating signal at spreading bands obtained at the carrier demodulator 412 is despread from the spreading band at the user signal despreading circuit 413 using a user signal spreading code so that a user signal is demodulated. The user signal includes a connection control data component (the output from the XOR 403) logically combined at the XOR 405, in addition to the user data. On the other hand, the modulating signal from the carrier demodulator 412 is also inputted to the pilot signal despreading circuit 415 and despread by a pilot signal spreading code so that the pilot signal is demodulated. This pilot signal also includes the connection control data component logically combined at the XOR 401.

The demodulated pilot signal with the connection control data component is subjected to a conjugate conversion at the conjugate conversion circuit 416 and is then given to the multiplier 414. At the multiplier 414, the demodulated user signal from the circuit 413 is multiplied by the pilot signal from the conjugate conversion circuit 415 so that the connection control data component is removed from the user signal. Simultaneously, the random phase rotation of the user signal caused by fading in the radio propagation path is corrected so that the user data is outputted from the multiplier 414. On the other hand, the demodulated pilot signal with the connection control data component is inputted to the multiplier 417. The output of the multiplier 417 is given to the delay circuit 418, where it is delayed by one bit and fed back to the multiplier 417. Through the functions of the multiplier 417 and the delay circuit 418, the connection control data component representing the differences between the adjacent two bits of the connection control data is decoded to be the connection control data. As will be appreciated, with respect to the connection control data, it is processed by differential phase shift keying at the transmitter side and then demodulated and decoded at the receiver side.

In the mobile radio communication system shown in FIG. 1, the pilot signal (all 0's) is inputted to the XOR 401. Accordingly, the XOR 401 outputs the output from the XOR 403 as it is. Specifically, when the pilot signal is in the all zero state, the system shown in FIG. 1 may be replaced by a system shown in FIG. 2, which shows the second preferred embodiment of the present invention. In this embodiment, the XOR 401 can be omitted.

Figure 2:
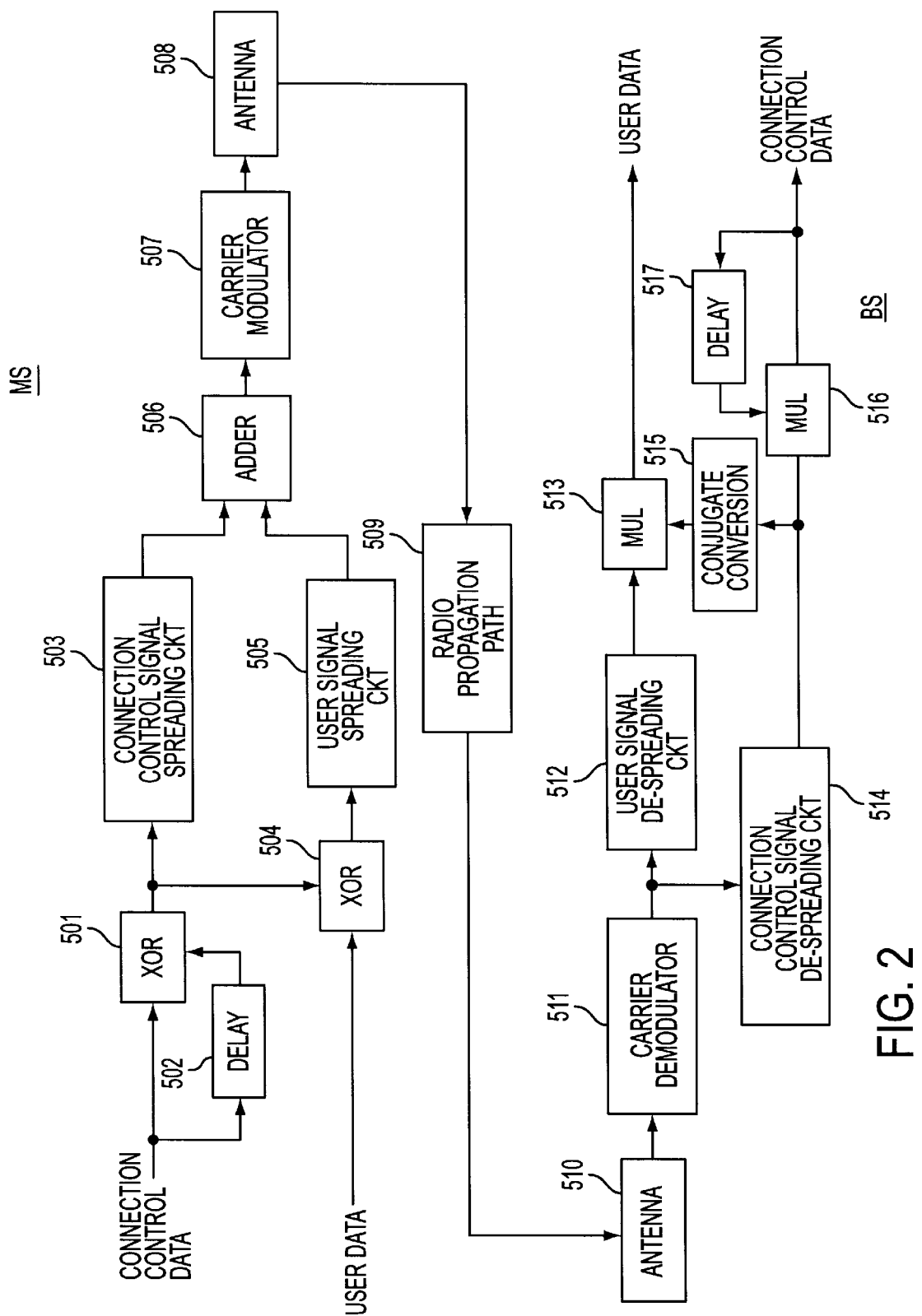
FIG. 2 is a block diagram showing a communication system according to a second preferred embodiment of the present invention.

In FIG. 2, the mobile station MS comprises an XOR 501 which is inputted with connection control data and one-bit delayed connection control data to derive a connection control signal, a delay circuit 502 for delaying the inputted connection control data by one bit, a connection control signal spreading circuit 503, an XOR 504, a user signal spreading circuit 505, an adder 506, a carrier modulator 507 and an antenna 508.

On the other hand, the base station BS comprises, similar to FIG. 1, an antenna 510, a carrier demodulator 511, a user signal despreading circuit 512, a multiplier 513, a connection control signal despreading circuit 514, a conjugate conversion circuit 515, a multiplier 516 and a one-bit delay circuit 517.

Since the function of each of the elements shown in FIG. 2 is the same as that of the corresponding element in FIG. 1, explanation thereof is omitted.

In the mobile radio communication system shown in FIG. 2, no independent pilot signal is transmitted so that the system handles the connection control signal as a pilot signal. When a modulating signal is subjected to the phase shift keying (PSK), logic "0" and logic "1" are assigned with real numbers "+1" and "−1", respectively. An exclusive OR operation may be replaced by multiplication in a real number calculation.

Now, a communication sequence for operation of the mobile station MS and the base station BS having the foregoing structures will be described.

After a power switch is turned on, the mobile station MS scans a partial sequence of the spreading code of the pilot channel of the base station BS to search for a timing when the signal strength of the pilot channel is the greatest in each period of the spreading code. The mobile station carries out the despreading at that timing so as to capture the pilot signal of the base station BS. After capturing the pilot signal of the base station BS, the mobile station MS captures broadcast information on a sync channel and so forth so as to obtain information necessary for an access to the base station BS. Based on this information, the mobile station MS carries out the access to the base station BS.

The access includes transmission of a message notifying the base station of the reception of the pilot signal, transmission of information for a user authentication and transmission of information for calling to the subject mobile station MS. The access is carried out using a spreading code designated by the base station BS. Although a signal for the access is a connection control signal, it is transmitted as user data in the system of FIG. 2. And the connection control data in the form of a pilot signal having all bits being "0" is simultaneously transmitted.

The base station BS stands by for receiving the access from the mobile station MS. The base station BS scans the spreading code designated for the mobile station in the broadcast information and judges that the access from the mobile station is received when the reception power exceeds a threshold value.

After the access and via calling from the base station BS to the mobile station MS or via a call request from the mobile station MS to the base station BS, communication between the base station BS and the mobile station MS is carried out using user channels. During the communication, the mobile station MS transmits the user signal and the connection control signal as a pilot signal with no data superposed. When transmission of the connection control data is required, the connection control data is transmitted through the differential phase shift keying (DPSK) as described above, and is simultaneously superposed on the user data through the logical operation as also described above. While the communication between the base station BS and the mobile station MS is carried out using the user channels, it is not necessary to transmit the connection control data so that the connection control data is the same as such data having all bits being "0". Accordingly, the connection control data agrees with a pattern of the pilot signal and thus works as the pilot signal.

For transmission and reception of the connection control data, for example, the HDLC (high-level data link control) procedure used in the LAPD (link access protocol on the D-channel) of the ISDN (integrated services digital network) may be used. The principal feature thereof resides in the following two points:

(1) As flag sequences (start/end flag sequences) representing the start and the end of a frame, "01111110" is transmitted and received.
(2) At the transmitter side, "0" is inserted after a run of 5 consecutive "1's" in a frame other than the start/end flag sequences. At the receiver side, after receipt of the start flag sequence, "0" after receipt of a run of 5 consecutive "1's" is deleted.

Upon detection of the start flag sequence of the frame from the demodulated data sequence, the base station BS starts communication on the connection control channel. Then, "0" deletion is performed during reception of the frame and, upon detection of the end flag sequence, the communication on the connection control channel is finished.

In the foregoing literature 1, the pilot channel is transmitted in the down link. When the structure shown in FIG. 1 or 2 is applied to the down link, the common broadcast information of the base station BS may be superposed on the pilot channel through the differential phase shift keying (DPSK).

In general, the pilot channel of the base station BS has the following two roles:

(1) The mobile station MS monitors the signal strengths of pilot channels transmitted from a plurality of base stations BS located nearby. The pilot channels are used by the mobile station MS to select one of the base stations BS which is the most appropriate for communication.

(2) The pilot channel is used by the mobile station MS to correct the random phase rotation applied to the signal transmitted from the base station BS due to fading in the radio propagation path and to carry out the efficient communication with the base station BS.

With respect to the role (1), for monitoring the signal strength of the pilot channel from the base station BS, the mobile station generally uses the sum of the squares of I-phase components and Q-phase components of a despread signal as a signal representing the signal strength of the pilot channel for avoiding an influence of the random phase rotation due to fading. On the other hand, for accomplishing the role (2), the pilot channel is modulated as having all data being "0" in the foregoing literatures 1 and 2. This is because the system is designed assuming that the phase components of the modulating data prior to transmission are kept constant.

However, for using the sum of the squares of the I-phase components and the Q-phase components as the signal representing the signal strength of the pilot channel, it is not necessarily required that the pilot channel has all data being "0". This is because, by deriving the sum of the squares of the I-phase components and the Q-phase components, those signals whose original signals appear on a complex plane are all converted in a positive direction of the real axis so that the sum of the squares representing the signal strength components and the data modulated on the pilot channel can be independently observed.

In this embodiment, the pilot signal is not directly transmitted. However, by monitoring the signal strength of the connection control data, the monitoring of the signal strength on the pilot channel for the foregoing role (1) can be achieved.

In this embodiment, the broadcast information modulated on a sync channel in the foregoing literatures 1 and 2 is superposed, as connection control data, on transmission signals through the differential phase shift keying (DPSK) as in the foregoing manner. Specifically, such broadcast information is simultaneously superposed on a pilot channel, paging channels and traffic channels referred to in the foregoing literatures 1 and 2 through differential phase shift keying (DPSK).

Accordingly, even if the pilot signal is subjected to data modulation, such as inversion, due to the broadcast information in an environment where random phase rotation due to fading occurs, since the signals on the other channels, such as paging channels and the traffic channels, are also subjected to a similar random phase rotation and data modulation, the data on the other channels, such as paging channels and the traffic channels, can be demodulated.

The mobile station MS can obtain the broadcast information transmitted through the differential phase shift keying (DPSK) by monitoring the signal strength of the pilot channel after the power is on and by receiving the signal at a timing where the signal strength is the greatest. Then, the broadcast information can be reconstructed using the foregoing HDLC procedure.

Now, the third preferred embodiment of the present invention win be described, wherein the present invention is applied to a transmitter-receiver of a radio switching system.

Figure 3:
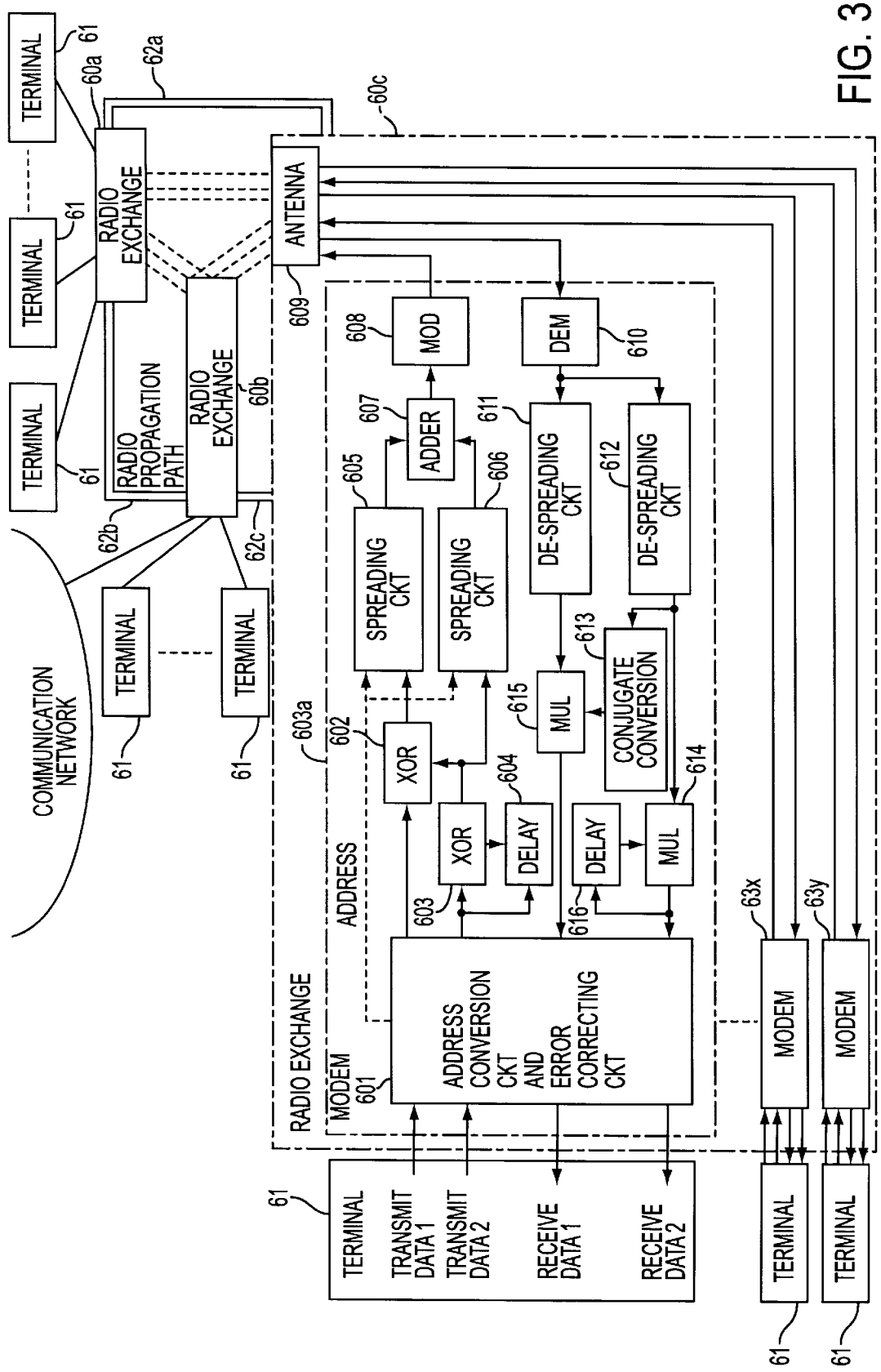
FIG. 3 is a block diagram showing a communication system according to a third preferred embodiment of the present invention.

FIG. 3 is a block diagram showing the structure of a radio switching system according to this embodiment. In FIG. 3, a number of terminals 61 are connected to radio switching systems 60a to 60c. The radio switching systems 60a and 60b are connected via a radio propagation path 62b, the radio switching systems 60a and 60c are connected via a radio propagation path 62a, and the radio switching systems 60b and 60c are connected via a radio propagation path 62c. As will be appreciated, although the three radio switching systems 60a to 60c are shown in FIG. 3, communicate more radio switching systems would be connected to each other via radio propagation paths.

When a communication request is raised from one of the terminals 61 connected to communicate with the radio switching system 60a to one of the terminals 61 connected to the radio switching system 60b or 60c, the radio switching systems 60a and 60b or 60a and 60c are linked using a transmission network composed of the radio propagation paths 62a to 62c so as to be linked between the associated terminals 61. In FIG. 3, for facilitating the explanation, switching offices and the like provided between the terminals 61 and the radio switching systems 60a to 60c are omitted. The shown radio switching systems are mobile and it is easy to increase the number of them.

As shown in detail in FIG. 3 at numeral 60c, each radio switching system has a plurality of modulators-demodulators (hereinafter referred to as "MODEM's") 63a to 63y each having a structure nearly the same as that shown in FIG. 2. To each MODEM, one terminal 61 is connected.

As shown in detail at numeral 63a, each MODEM comprises an address conversion and error correcting circuit 601, XOR's 602 and 603, a delay circuit 604, a user signal spreading circuit 605, a connection control signal spreading circuit 606, an adder 607, a carrier modulator 608, a carrier demodulator 610, a user signal despreading circuit 611, a connection control signal despread circuit 612, a conjugate conversion circuit 613, multipliers 614 and 615 and a one-bit delay circuit 616. An antenna 609 is shared by each of the MODEMs.

The operation of each MODEM is basically the same as that of the system shown in FIG. 2. As described with reference to FIG. 2, user data from the terminal 61 is inputted to the XOR 602 where an exclusive OR operation is executed to derive an exclusive OR between the inputted user data and a signal representing differences between two adjacent bits of connection control data. As described before, such a signal is obtained by processing the connection control data using the XOR 603 and the delay circuit 604. The output from the XOR 602 is spread at the user signal spreading circuit 605. The signal from the XOR 603 is also spread at the connection control signal spreading circuit 606. The spread signals from the circuits 605 and 606 are multiplexed at the adder 607. Then, at the carrier modulator 608, phase shift keying (PSK) is carried out using a multiplexed spread signal from the adder 607 as a modulating signal to obtain a PSK modulated carrier. The PSK modulated carrier is transmitted to another MODEM.

The PSK modulated carrier is received at another MODEM and then demodulated at the carrier demodulator 610 to obtain the modulating signal. The modulating signal is then despreading at the user signal despread circuit 611 and the connection control signal despreading circuit 612, respectively. The despread signal from the circuit 612, representing the differences between the adjacent two bits of the connection control data, is processed through the multiplier 614 and the delay circuit 616 so that the connection control data is reconstructed. On the other hand, the despread signal from the circuit 612 is subjected to a conjugate conversion at the conjugate conversion circuit 613 and is then given to the multiplier 615. At the multiplier 615, the despread user signal from the circuit 611 is multiplied by the signal from the conjugate conversion circuit 613 so that the connection control data component is removed from the user signal. Simultaneously, the random phase rotation of the user signal caused by fading in the radio propagation path is corrected so that the user data is reconstructed.

For distinguishing among the lines at the receiver side, each of the despreading circuits is assigned in advance its own spreading code which is the same as that of the corresponding spreading circuit at the transmitter side.

When the output of the despreading circuit exceeds a given threshold value, the receiver side determines that a line is connected, and operates a physical layer. In the address conversion and error correcting circuits 601, operations of upper layers are carried out. Specifically, as a function of a network layer, an address for data transmission sent from a terminal is analyzed and converted, and the converted address is fed to the spreading circuits 605 and 606. The converted address uses, for example, a register initial value of a spreading code generator at a certain time. As a function of a data-link layer, the error correcting circuit 601 is connected to both up and down lines to carry out an error retransmission so as to remove a transmission error in a radio path and guarantee the order of data sequences.

When, for example, a slotted ALOHA system is used as an access technique at the transmitter side, synchronization between the spreading upon transmission and the despreading upon reception can be easily achieved by handling a period of the spreading code as a slot. As compared with a pure ALOHA system, the transmission efficiency is improved.

For further improving the transmission efficiency, the connection is controlled by ensuring a channel for transmitting a control signal for switching, broadcasting the reception line states or giving a connection command to a counterpart station. This is called flow control. A transmitter station wishing a transmission packetizes a transmission request message for transmission to a receiver station. This packet transmission is carried out based on the slotted ALOHA system. By reducing the length of a packet, the collision probability can be lowered. When the transmission request message arrives at the receiver station, the receiver station ensures a transmission channel as requested by the transmission request message and transmits a transmission approval message to the transmitter station. Then, the transmitter station carries out a transmission according to the transmission approval message. By executing the schedule in this manner, the transmission efficiency can be enhanced.

As described above, according to the foregoing preferred embodiments, since only the user data is transmitted on the traffic channel, the transmission rate of the user data can be kept high. On the other hand, the connection control data is modulated on the pilot channel through the differential phase shift keying (DPSK). Since the proper error correction coding is used, the SN ratio error characteristic can be kept adequate. Since these two kinds of data transmission (user data transmission and connection control data transmission) can be realized, code division multiple access communication which is small in quality degradation and high in transmission efficiency can be accomplished with the simple structures of the system.

Further, since the connection control data is not time-division multiplexed with the user data, time-division multiplexers, which are required for all the traffic channels in the prior art, are not necessary, and controllers, which are required for determining the allocation of the user data and the connection control data into the traffic channel frames in the prior art, are not necessary. Accordingly, since the hardware becomes simple in structure, the system becomes smaller in size. Further, the transmission delay due to the framing operation can be suppressed, and the system does not require a voice detection circuits. Accordingly, the whole communication system can be designed more easily as compared with the prior art.

In the foregoing preferred embodiments, the present invention is applied to mobile radio communication system, and the mobile station and the base station employed in the system, and further applied to the transmitter-receiver of a mobile radio switching system. However, the present invention is also applicable to other communication systems. For example, the present invention is also applicable to a communication system composed of a pair of communication stations, and thus is not limited to a code division multiple access communication system.

Further, in the foregoing preferred embodiments, the figures show only two kinds of the transmission data other than the pilot signal. However, the present invention is also applicable to a case where the system employs three or more kinds of the transmission data other than the pilot signal. For example, in case of FIG. 1, the number of sets of the XOR 405, the spreading circuit 406, the despread circuit 413 and the multiplier 414 may be increased as the number of kinds of transmission data increases.

What is claimed is:

1. A transmitter comprising:

a circuit for receiving first data and deriving second data representing relative changes in state between first data that are adjacent to one another;

a first spreading circuit for receiving said second data and spreading said second data to a spreading band by a first spreading code to derive first spread data;

a logic circuit for receiving third data and logically combining said third data and said second data to derive fourth data;

a second spreading circuit for receiving said fourth data and spreading said fourth data to a spreading band by a second spreading code to derive second spread data, said first and second spreading codes being different from each other;

an adding circuit for adding said first and second spread data to derive third spread data; and a modulating circuit for receiving said third spread data and applying phase shift keying to said third spread data.

2. The transmitter according to claim 1, wherein said first data is connection control data including a data pattern of a pilot signal at a baseband, said pilot signal being adapted to correct random phase rotation caused by fading in a radio propagation path.

3. A transmitter comprising:

a circuit for receiving first data and deriving second data representing relative changes in state between first data that are adjacent to one another;

a logic circuit for logically combining said second data and a pilot signal at an baseband to provide logically-combined data, said plot signal being adapted to correct random phase rotation cause by fading in a radio propagation path;

a first spreading circuit for receiving said logically-combined data and spreading said logically-combined data to a spreading band by a first spreading code to derive first spread data;

another logic circuit for receiving third data and logically combining said third data and said second data to derive fourth data;

a second spreading circuit for receiving said fourth data and spreading said fourth data to a spreading band by a second spreading code to derive second spread data, said first and second spreading codes being different from each other;

an adding circuit for adding said first and second spread data to derive third spread data; and a modulating circuit for receiving said third spread data and applying phase shift keying to said third spread data, wherein said first data is connection control data.

4. A receiver comprising:

a demodulating circuit for receiving a carrier modulated through phase shift keying and demodulating said modulated carrier to derive data at spreading bands, said data including a first data component which includes information representing relative changes in state between first data that are adjacent to one another, said data additionally including a second data component which includes second data and information derived from said first data component;

a first despreading circuit for despreading said data by a first spreading code to extract said first data component;

a second despreading circuit for despreading said data by a second spreading code different from said first spreading code to extract said second data component;

a first decoding circuit for processing said first data component from said first despreading circuit to derive said first data; and a second decoding circuit for multiplying said second data component from said second despreading circuit by information derived from said first data component from said first despreading circuit to correct random phase rotation due to fading in a radio propagation path so as to derive said second data.

5. The receiver according to claim 4, wherein said first decoding circuit comprises a multiplier and a one-bit delay circuit for processing said first data component to derive said first data.

6. A communication system comprising:

a first communication device having a receiver, said receiver including:

a demodulating circuit for receiving a carrier modulated through phase shift keying and demodulating said modulated carrier to derive date;

a first despreading circuit for despreading said data by a first spreading code to extract a first data component;

a second despreading circuit for despreading said data by a second spreading code different from said first spreading code to extract a second data component;

a first decoding circuit for processing said first data component from said first despreading circuit to derive first data, said first data component including information representing relative changes in state between first data that are adjacent to one another; and a second decoding circuit for multiplying said second data component from said second despreading circuit by information derived from said first data component from said first despreading circuit to correct random phase rotation due to fading in a radio propagation path so as to derive second data; and a second communication device having a transmitter, said transmitter including:

a circuit for receiving said first data and deriving said information representing relative changes in state between first data that are adjacent to one another;

a first spreading circuit for receiving said information representing relative changes in state and spreading said information representing relative changes in state by said first spreading code to derive first spread data;

a logic circuit for receiving third data and logically combining said third data and said information representing relative changes in state to derive fourth data;

a second spreading circuit for receiving said fourth data and spreading said fourth data by said second spreading code to derive second spread data;

an adding circuit for adding said first and second spread data to derive third spread data; and a modulating circuit for receiving said third spread data and generating said carrier modulated through phase shift keying by applying phase shift keying to said third spread data.

7. The communication system according to claim 6, wherein said first communication device comprises a circuit for transmitting, after receipt of a signal from said second communication device, a message to said second communication device notifying completion of the receipt of said signal, and wherein said second communication device comprises a circuit for transmitting, after receipt of said message, said third data.

8. The communication system according to claim 6, wherein said first communication device comprises a circuit for transmitting, after receipt of a signal from said second communication device, a message to said second communication device notifying completion of the receipt of said signal, and wherein said second communication device comprises a circuit for transmitting, after receipt of said message, said first data.

9. The communication system according to claim 6, wherein said first decoding circuit of said receiver comprises a multiplier and a one-bit delay circuit for processing said first data component to derive said first data.

10. A communication system according to a code division multiple access system comprising:

a first communication device and a second communication device, wherein each of the first and second communication devices has a transmitter, said transmitter including:

a circuit for receiving first data and deriving second data representing relative changes in state between first data that are adjacent to one another;

a first spreading circuit for receiving said second data and spreading said second data by a first spreading code to derive first spread data;

a logic circuit for receiving third data and logically combining said third data and said second data to derive fourth data;

a second spreading circuit for receiving said fourth data and spreading said fourth data by a second spreading code to derive second spread data, said first and second spreading codes being different from each other;

an adding circuit for adding said first and second spread data to derive third spread data; and a modulating circuit for receiving said third spread data and for generating a carrier modulated through phase shift keying by applying phase shift keying to said third spread data; and wherein each of said first and second communization devices has a receiver, said receiver including:

a demodulating circuit for receiving said carrier modulated through phase shift keying and demodulating said modulated carrier to derive date;

a first despreading circuit for despreading said data by said first spreading code to extract a first data component;

a second despreading circuit for despreading said data by said second spreading code;

a first decoding circuit for processing said first data component from said first despreading circuit to derive said first data; p2 a second decoding circuit for multiplying said second data component from said despreading circuit by information derived from said first data component from said first despreading circuit to correct random phase rotation due to fading in a radio propagation path so as to derive said third data.

11. The communication system according to claim 10, wherein said first communication device comprises a circuit for transmitting, after receipt of a signal from said second communication device, a message to said second communication device notifying completion of the receipt of said signal, and wherein said second communication device comprises a circuit for transmitting, after receipt of said message, said third data.

12. The communication system according to claim 10, wherein said first communication device comprises a circuit for transmitting, after receipt of a signal from said second communication device, a message to said second communication device notifying completion of the receipt of said signal, and wherein said second communication device comprises a circuit for transmitting, after receipt of said message, said first data according to claim 1.

13. The communication system according to claim 10, wherein said first decoding circuit of said receiver of each communication device comprises a multiplier and a one-bit delay circuit for processing said first data component to derive said first data.

14. A communication system according to a code division multiple access system comprising:

a first communication device and a second communication device, wherein each of the first and second communication devices has a transmitter, said transmitter including:

a circuit for receiving first data and deriving second data representing relative changes in state between first data that are adjacent to one another, said first data being connection control data;

a logic circuit for logically combining said second data and a pilot signal at a baseband to provide logically combined data, said pilot signal being adapted to correct random phase rotation caused by fading in a radio propagation path;

a first spreading circuit for receiving said logically-combined data and spreading said logically combined by a first spreading code to derive first spread data;

another logic circuit for receiving third data and logically combining said third data and said second data to derive fourth data;

a second spreading circuit for receiving said fourth data and spreading said fourth data band by a second spreading code to derive second spread data, said first and second spreading codes being different from each other;

an adding circuit for adding said first and second spread data to derive third spread data; and a modulating circuit for receiving said third spread data and for generating a carrier modulated through phase shift keying by applying phase shift keying to said third spread data; and wherein each of said first and second communication devices has a receiver, said receiver including:

a demodulating circuit for receiving said carrier modulated through phase shift keying and demodulating said modulated carrier to derive data;

a first despreading circuit for despreading said data by said first spreading code to extract a first data component;

a second despreading circuit for despreading said data by said second spreading code;

a first decoding circuit for processing said first data component from said first despreading circuit to derive said first data, said first data component, including information representing relative changes between adjacent states of said first data; and a second decoding circuit for multiplying said second data component from said second despreading circuit by information derived from said first data component from said first despreading circuit to correct random phase rotation due to fading in a radio propagation path so as to derive third data.

15. The communication system according to claim 14, wherein said first decoding circuit of said receiver of each communication device comprises a multiplier and a one-bit delay circuit for processing said first data component to derive said first data.

* * * * *